(12) United States Patent
Yeom et al.

(10) Patent No.: US 12,040,124 B2
(45) Date of Patent: Jul. 16, 2024

(54) TRANSFORMER AND DC-DC CONVERTER INCLUDING SAME

(71) Applicant: LG INNOTEK CO., LTD., Seoul (KR)

(72) Inventors: Jai Hoon Yeom, Seoul (KR); Soo Kwang Yoon, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 519 days.

(21) Appl. No.: 17/310,535

(22) PCT Filed: Feb. 5, 2020

(86) PCT No.: PCT/KR2020/001661
§ 371 (c)(1),
(2) Date: Aug. 9, 2021

(87) PCT Pub. No.: WO2020/162682
PCT Pub. Date: Aug. 13, 2020

(65) Prior Publication Data
US 2022/0068557 A1 Mar. 3, 2022

(30) Foreign Application Priority Data
Feb. 7, 2019 (KR) .......................... 10-2019-0014393

(51) Int. Cl.
*H01F 27/28* (2006.01)
*H01F 27/24* (2006.01)
(Continued)

(52) U.S. Cl.
CPC ........... *H01F 27/325* (2013.01); *H01F 27/24* (2013.01); *H02M 3/24* (2013.01)

(58) Field of Classification Search
CPC .... H01F 27/325; H01F 27/24; H01F 27/2828; H01F 27/2852; H01F 27/303;
(Continued)

(56) References Cited

U.S. PATENT DOCUMENTS 8,766,756 B2 * 7/2014 Hester .................. H01F 27/30
336/90
2004/0246089 A1 12/2004 Stephens
(Continued)

FOREIGN PATENT DOCUMENTS

| CN | 2646841 Y | 10/2004 |
| CN | 102376432 A | 3/2012 |

(Continued)

OTHER PUBLICATIONS

International Search Report dated May 21, 2020 in International Application No. PCT/KR2020/001661.
(Continued)

*Primary Examiner* — Shawki S Ismail
*Assistant Examiner* — Kazi S Hossain
(74) *Attorney, Agent, or Firm* — Saliwanchik, Lloyd & Eisenschenk

(57) ABSTRACT

The present invention relates to a transformer and, more specifically, to a transformer including a secondary coil part which comprises stacked conductive plates. A transformer according to an embodiment of the present invention may comprise: a core part having a middle leg and outer legs; a secondary coil part including multiple conductive plates vertically stacked to form coil turns around the middle leg; and a primary coil part including conductive wires wound to form coil turns around the respective outer legs.

14 Claims, 10 Drawing Sheets

(51) Int. Cl.
*H01F 27/32* (2006.01)
*H02M 3/24* (2006.01)

(58) Field of Classification Search
CPC ...... H01F 27/2847; H01F 27/30; H02M 3/24; H02M 3/33576; H02M 3/003; H02M 3/28
USPC .................................. 336/221, 55–61, 183
See application file for complete search history.

(56) References Cited

U.S. PATENT DOCUMENTS

| | | | |
|---|---|---|---|
| 2009/0278648 A1 | 11/2009 | Teng et al. | |
| 2012/0002387 A1* | 1/2012 | Park | H05B 41/02 361/679.01 |
| 2013/0154787 A1* | 6/2013 | Maeda | H01F 27/326 336/220 |
| 2015/0357111 A1* | 12/2015 | Sasaki | H01F 5/04 29/605 |

FOREIGN PATENT DOCUMENTS

| | | |
|---|---|---|
| GB | 1321854 A | 7/1973 |
| JP | 6-120053 A | 4/1994 |
| JP | 09-275017 A | 10/1997 |
| JP | 2006-108389 A | 4/2006 |
| JP | 2007-335453 A | 12/2007 |
| JP | 2012-10539 A | 1/2012 |
| JP | 2014-220421 A | 11/2014 |
| KR | 10-2004-0106716 A | 12/2004 |

OTHER PUBLICATIONS

Office Action dated Nov. 16, 2023 in Korean Application No. 10-2019-0014393.
Office Action dated Jun. 30, 2023 in Chinese Application No. 202080013326.1.

* cited by examiner

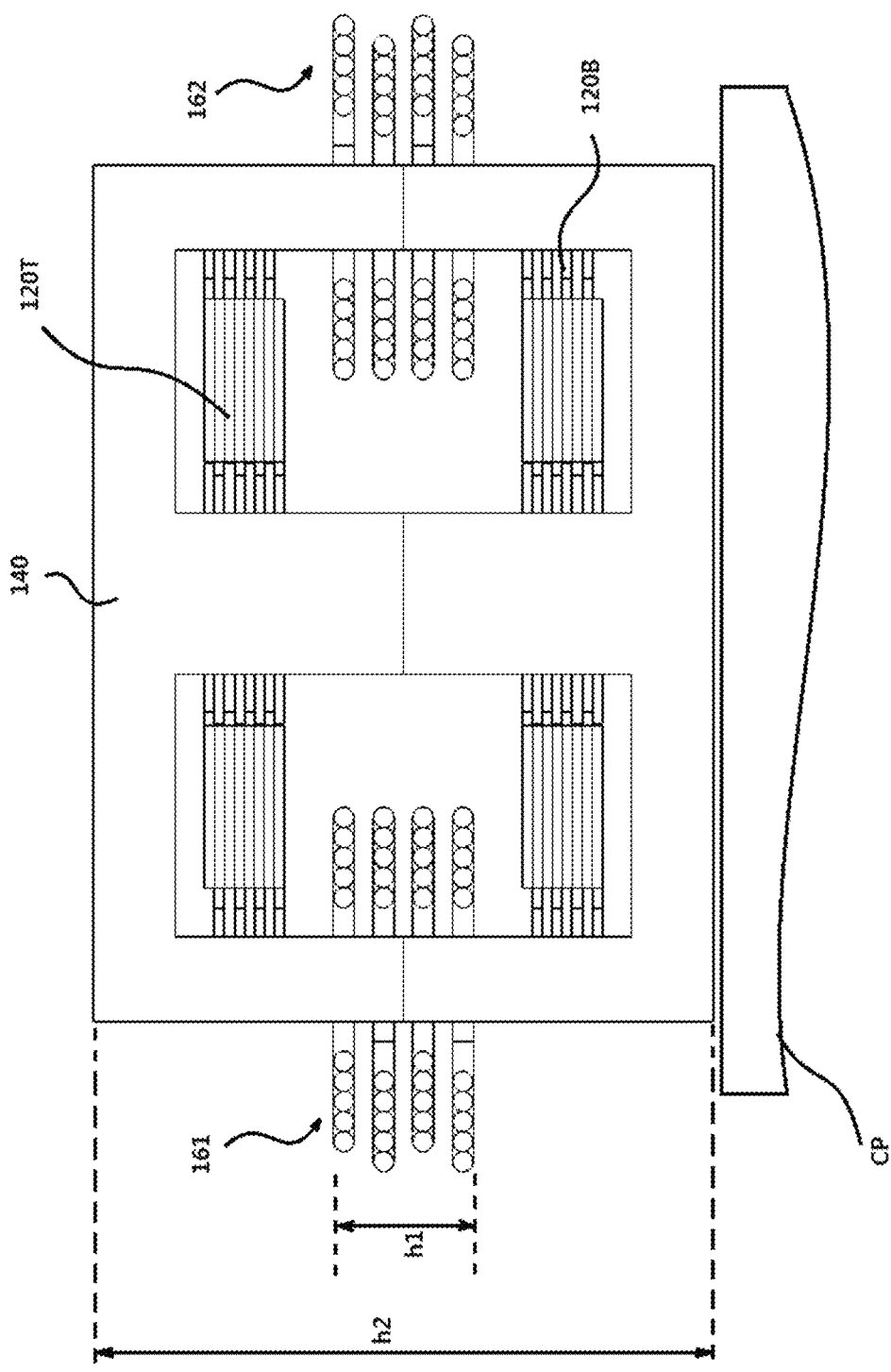

TRANSFORMER AND DC-DC CONVERTER INCLUDING SAME

CROSS-REFERENCE TO RELATED APPLICATIONS

This application is the U.S. national stage application of International Patent Application No. PCT/KR2020/001661, filed Feb. 5, 2020, which claims the benefit under 35 U.S.C. § 119 of Korean Application No. 10-2019-0014393, filed Feb. 7, 2019, the disclosures of each of which are incorporated herein by reference in their entirety.

TECHNICAL FIELD

Embodiments relate to a transformer having a secondary coil unit including stacked conductive plates and a DC-DC converter including the same.

BACKGROUND ART

With recent continuous concern about environment and environmental regulations, research on a vehicle having an electric motor has been actively conducted. In general, such a vehicle is provided with a high-voltage battery configured to drive the electric motor and an auxiliary battery configured to supply electric power to an electronic load. The auxiliary battery may be charged with electric power of the high-voltage battery. In order to charge the auxiliary battery, it is necessary to convert DC power of the high-voltage battery into DC power corresponding to voltage of the auxiliary battery. To this end, a DC-DC converter may be used.

FIG. 1 is a block diagram showing an example of the construction of a general DC-DC converter.

Referring to FIG. 1, the DC-DC converter 10 may be disposed between a first battery (Batt1) 20 and a second battery (Batt2) 30, and may include a drive circuit 11, a transformer 12, and an output circuit 13.

The first battery 20 may output DC voltage and DC current, and the transformer 12 may convert AC voltage and AC current. Consequently, the drive circuit 11 may convert DC current output by the first battery 20 into AC current, which is changed over time, and may supply the AC current to a primary coil of the transformer 12 such that the AC current is input to the transformer 12. To this end, the drive circuit 11 may include a plurality of drive switches constituting a full bridge, and each drive switch may be operated under control of a controller 40.

The transformer 12 receives AC power from the drive circuit 11, steps up or down the AC power so as to correspond to relative voltage difference between the first battery 20 and the second battery 30, and outputs the converted power to a secondary coil. In addition, the output circuit 13 may convert AC current output from the transformer 12 into DC current, and may transmit the DC current to the second battery 30.

Here, the transformer 12 includes a magnetic core, and the primary coil and the secondary coil are disposed around the magnetic core. The shape and function of the magnetic core will be described with reference to FIGS. 2A and 2B.

FIG. 2A is a front view of a general magnetic core, and FIG. 2B is a perspective view of a lower core constituting the general magnetic core.

Referring to FIGS. 2A and 2B, the general magnetic core C may include an upper core C1 and a lower core C2. Here, each of the upper core C1 and the lower core C2 may be an "E"-shaped core, as shown. The magnetic core C may have the function of a magnetic circuit. For example, magnetic flux $\Phi_I$ that flows upwards in a middle leg CC is divided into left and right magnetic flux components $\Phi_{II}$ and $\Phi_{III}$ in the upper part of the core, and the left and right magnetic flux components flow downwards in outer legs CL and CR, respectively, and join each other in the middle leg CC. In this way, the magnetic flux may be circulated. At this time, the magnitude of the magnetic flux $\Phi_I$ that flows in the middle leg CC is the sum of the magnitudes of the magnetic flux components $\Phi_{II}$ and $\Phi_{III}$ that flow in the outer legs CL and CR, respectively (i.e. $\Phi_I = \Phi_{II} + \Phi_{III}$), and the magnitude of the magnetic flux that flow in each outer leg is proportional to the sectional area of a path of the magnetic flux. In order for the magnetic flux $\Phi_I$ generated in the middle leg CC to smoothly flow through the two outer legs CL and CR, therefore, it is preferable for the sum of the sectional areas of the two outer legs CL and CR to be equal to or greater than the sectional area of the middle leg CC. For example, on the assumption that the middle leg CC and the two outer legs CL and CR have a rectangular planar shape and an identical y-axis direction length L1, as shown in FIG. 2B, it is preferable for the sum of the width W2 of the left outer leg CL and the width W3 of the right outer leg CR to correspond to at least the width W1 of the middle leg.

In the general transformer, however, both the primary coil and the second coil are located at only the middle leg CC of the magnetic core C. Consequently, the height of the middle leg CC in a vertical direction (i.e. a z-axis direction) must be secured to such an extent that it is possible to receive all of the primary coil and the second coil as well as a bobbin. In addition, all coils are wound around the middle leg CC having the greatest circumferential length (i.e. W1>W2, W3), which is disadvantageous in the aspect of material constituting the coils, and a current movement path is lengthened, which is undesirable in the aspect of heat generation and efficiency.

DISCLOSURE

Technical Problem

Embodiments have been made in view of the above problems and provide a transformer having higher efficiency.

In particular, embodiments provide a transformer having a structure in which at least a portion of a primary coil and a secondary coil is wound around an outer leg.

Objects of embodiments are not limited to the aforementioned objects, and other unmentioned objects will be clearly understood by those skilled in the art based on the following description.

Technical Solution

In one embodiment, a transformer includes a core unit having a middle leg and an outer leg, a secondary coil unit including a plurality of conductive plates stacked in a vertical direction so as to form turns around the middle leg, and a primary coil unit including a conductive wire wound so as to form turns around the outer leg.

For example, the outer leg may include a first outer leg disposed at one side of the core unit and a second outer leg disposed at the other side of the core unit, and the primary coil unit may include a first conductive wire wound around the first outer leg and a second conductive wire wound around the second outer leg.

For example, the transformer may further include a bobbin having a first through hole, through which the middle leg extends, a second through hole, through which the first outer leg extends, and a third through hole, through which the second outer leg extends.

For example, the secondary coil unit may include an upper coil unit disposed at the upper part of the bobbin and a lower coil unit disposed at the lower part of the bobbin.

For example, the plurality of conductive plates constituting the upper coil unit and the lower coil unit may include a plurality of first type conductive plates having a first planar shape and a plurality of second type conductive plates having a second planar shape, and the first type conductive plates and the second type conductive plates may be alternately stacked in the vertical direction.

For example, the first planar shape and the second planar shape may be left-right symmetric.

For example, the bobbin may provide a first receiving hole configured to receive the upper coil unit, a second receiving hole configured to receive the first conductive wire, a third receiving hole configured to receive the second conductive wire, and a fourth receiving hole configured to receive the lower coil unit.

For example, the second receiving hole and the third receiving hole may be disposed between the first receiving hole and the fourth receiving hole in the vertical direction.

For example, the second receiving hole and the third receiving hole may be disposed spaced apart from each other in parallel in a horizontal direction.

In another embodiment, a DC-DC converter includes a drive circuit, a transformer, and an output circuit. Here, the transformer may include a core unit having a middle leg and an outer leg, a secondary coil unit including a plurality of conductive plates stacked in a vertical direction so as to form turns around the middle leg, and a primary coil unit including a conductive wire wound so as to form turns around the outer leg.

Advantageous Effects

A transformer according to an embodiment has the following effects.

First, a primary coil is wound around an outer leg having a smaller circumference than a middle leg, whereby the length of a conductive wire constituting the primary coil is reduced, and therefore generation of heat is reduced and efficiency is improved.

Second, the primary coil is wound around two middle legs in a divided state, whereby the height of a core necessary to wind the primary coil in a vertical direction is reduced.

Third, in the case in which a cooling means abuts one side of the core in the vertical direction due to the reduced height of the core, a heat transfer path is shortened, whereby cooing efficiency is improved.

It should be noted that the effects of embodiments are not limited to the effects mentioned above, and other unmentioned effects will be clearly understood by those skilled in the art from the following description.

DESCRIPTION OF DRAWINGS

The accompanying drawings, which are provided to assist in understanding the disclosure, illustrate embodiments of the disclosure together with a detailed description thereof. It is to be understood, however, that the technical features of the disclosure are not limited to the specific drawings, and the features disclosed in the drawings may be combined to constitute a new embodiment.

FIG. 8 is a sectional view of the transformer according to the embodiment.

BEST MODE

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

In describing embodiments, it will be understood that when an element is referred to as being "on or under" or "in front of or at the rear of" another element, this includes the case in which two elements directly contact each other and the case in which at least one other element is disposed between the two elements.

Also, in describing the components of the disclosure, terms such as "first," "second," "A," "B," "(a)," and "(b)" may be used. These terms are used only for the purpose of distinguishing one constituent from another, and the terms do not limit the nature, order or sequence of the components. When one component is said to be "connected," "coupled," or "linked" to another, this may mean not only that the one component is directly connected, coupled, or linked to the other one but also that the one component is "connected," "coupled," or "linked" to the other one via yet another component interposed therebetween.

In addition, the terms "include," "comprise" and "have" mean that elements can be inherent unless otherwise stated. Therefore, the terms should be interpreted not to exclude other elements but to further include such other elements. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as having ideal or excessively formal meanings.

Hereinafter, a transformer according to an embodiment will be described in detail with reference to the accompanying drawings.

Figure 3:
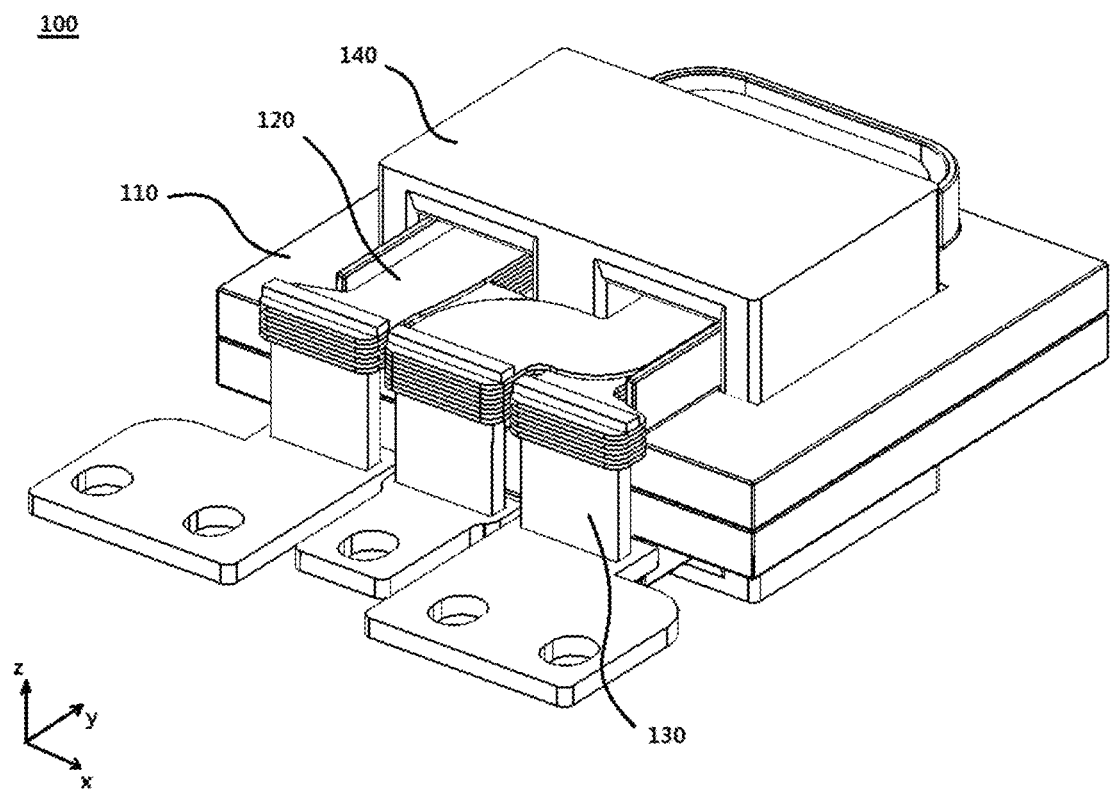
FIG. 3 is a perspective view showing the external appearance of a transformer according to an embodiment.
Figure 4A:
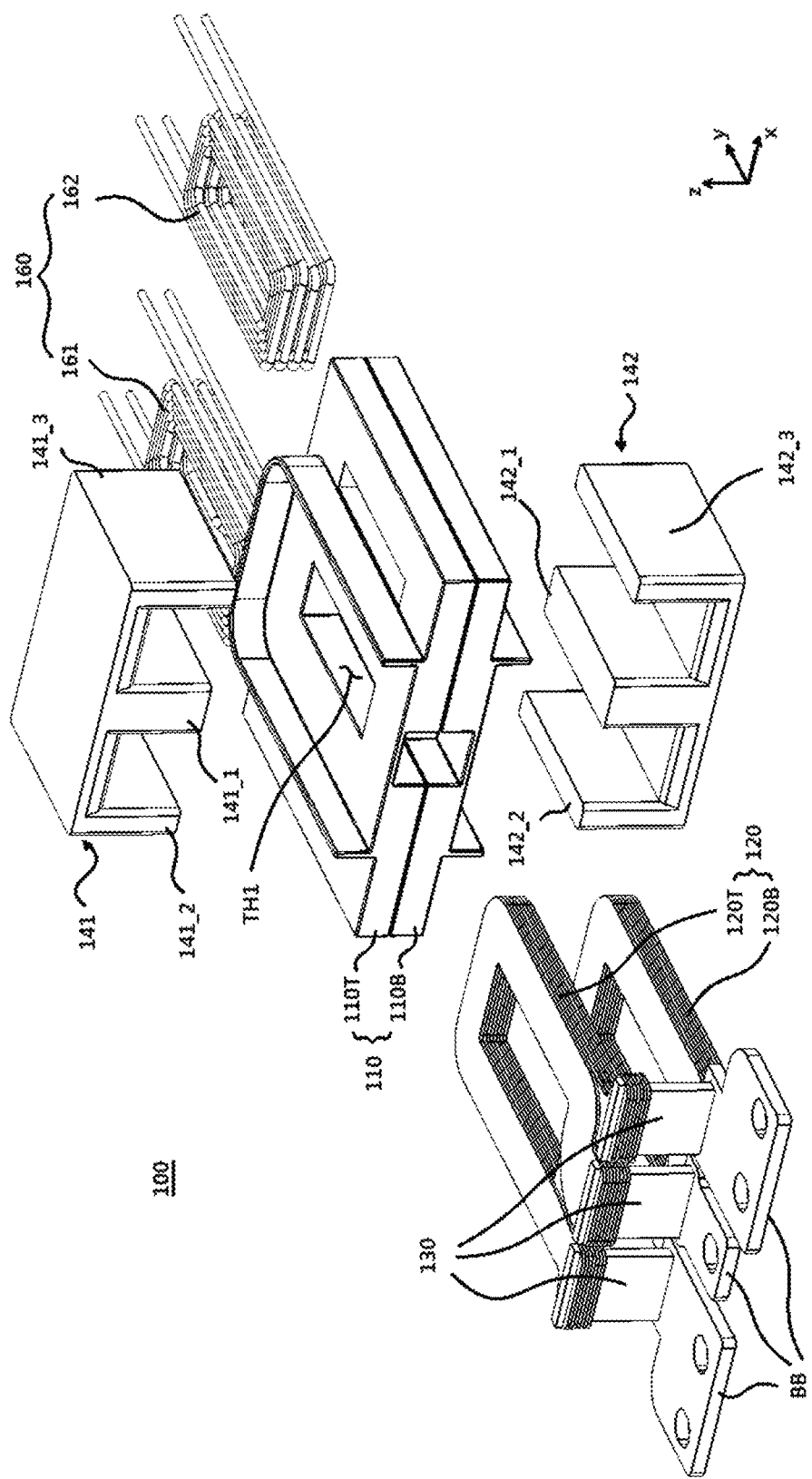
FIGS. 4A and 4B are exploded perspective views of the transformer according to the embodiment.
Figure 4B:
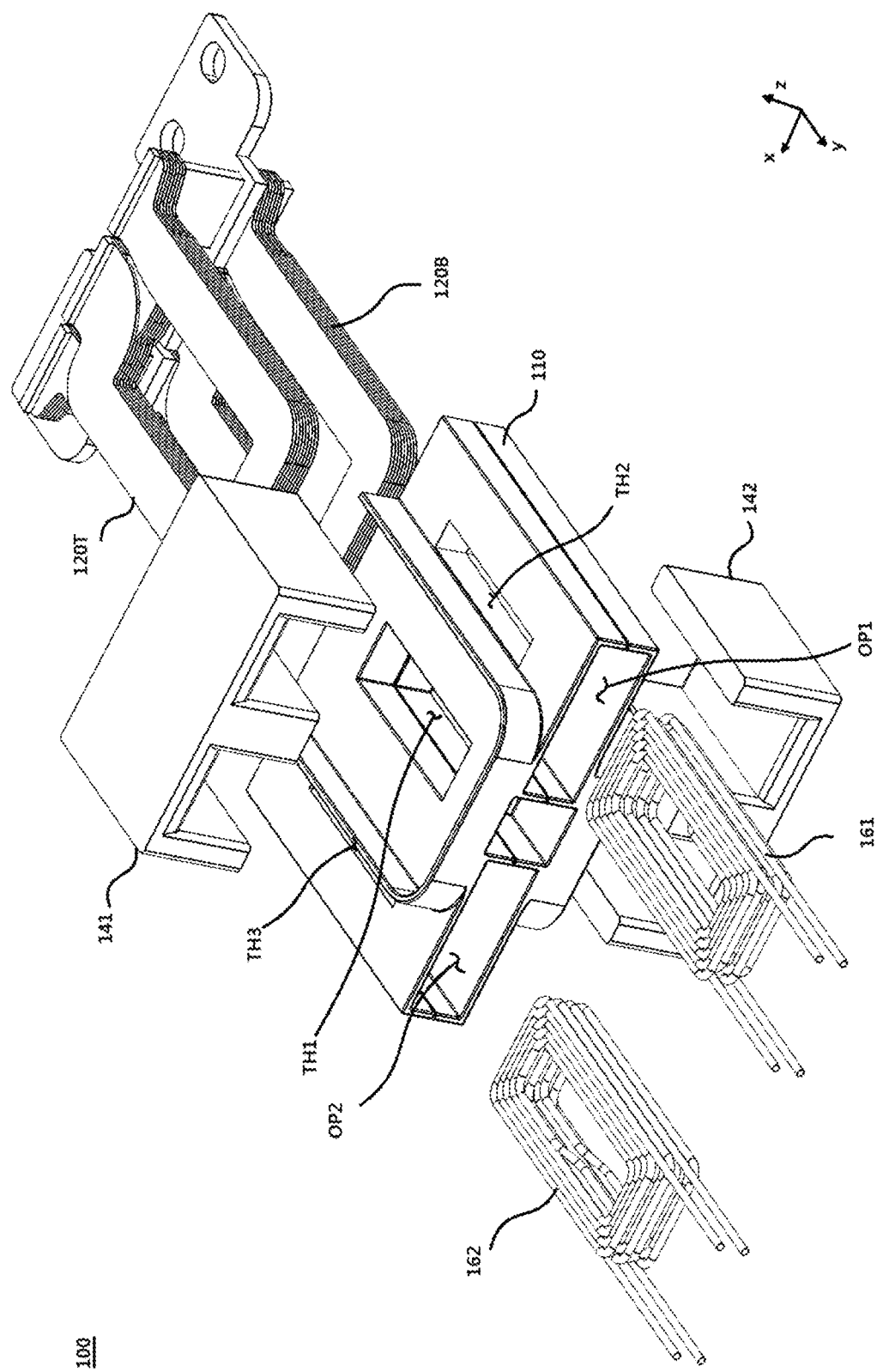

FIG. 3 is a perspective view showing the external appearance of a transformer according to an embodiment, and FIGS. 4A and 4B are exploded perspective views of the transformer according to the embodiment.

Referring to FIGS. 3 to 4B, the transformer 100 according to the embodiment may include a bobbin 110, a plurality of conductive plates 120 disposed on the bobbin 110 or inserted into the bobbin 110, a plurality of fastening portions 130 configured to electrically connect the plurality of conductive plates 120 in order to constitute a secondary coil unit together with the plurality of conductive plates 120, a core unit 140 coupled to the bobbin 110 in the state in which a middle leg and outer legs thereof extend through the bobbin 110, and a primary coil unit 160 inserted into the bobbin 110.

The secondary coil unit 120 and 130 may transform and output a power signal received from the primary coil unit 160. In FIGS. 3 to 4B, a total of 16 conductive plates may be disposed in a state of being stacked in a thickness direction (e.g. a z-axis direction) in order to constitute the secondary coil unit 120 and 130. Each conductive plate may correspond to one turn of the secondary coil unit. However, this is illustrative, and a larger or smaller number of conductive plates may be used.

For example, the plurality of conductive plates 120 may be disposed on the bobbin 110, or may be inserted into the bobbin 110, in a direction parallel to a y axis.

The plurality of conductive plates 120 may be electrically insulated from each other via an insulation material except for electrical connection through the fastening portions 130. For example, an insulation film may be disposed between neighboring ones of the plurality of conductive plates in order to electrically insulate the conductive plates from each other. The insulation film may include a component such as ketone or polyimide. However, the disclosure is not limited thereto. The conductive plates 120 may include an upper coil unit 120T and a lower coil unit 120B, and the coil units 120T and 120B may be spaced apart from each other in the thickness direction.

In addition, each of the plurality of conductive plates 120 may include a conductive metal, such as copper. However, the disclosure is not limited thereto. For example, the plurality of conductive plates may include aluminum. In the case in which aluminum is used instead of copper, the thickness of the conductive plate may be greater by about 60% than in the case in which copper is used. However, the disclosure is not limited to such a thickness ratio.

In addition, each of the plurality of conductive plates 120 may be disposed so as to form one turn around the middle leg of the core unit 140.

The bobbin 110 may have a shape suitable to receive or fix at least a portion of each of the plurality of conductive plates 120 and the core unit 140 in the state in which conductive wires 161 and 162 constituting the primary coil unit 150, the plurality of conductive plates 120 constituting the secondary coil unit, and the core unit 140 are insulated from each other. For example, the bobbin 110 may have through holes TH1, TH2, and TH3 having planar shapes corresponding to the shapes of the middle leg and the outer legs of the core unit 140 such that the middle leg and the outer legs extend therethrough.

The bobbin 110 may include an insulative material, such as a resin material, and may be produced using various molding methods. The bobbin 110 according to the embodiment may have openings configured to expose the upper surface of the uppermost conductive plate in the thickness direction and the lower surface of the lowermost conductive plate in the thickness direction, among the plurality of conductive plates 120. The more concrete shape of the bobbin 110 will be described below with reference to FIG. 5.

The fastening portions 130, each of which has the shape of a metal bar, may extend through ends of the conductive plates 120 in the thickness direction (e.g. the z-axis direction), and may be fixed to the conductive plates 120 by soldering. Of course, depending on embodiments, the metal bar may be replaced with other fastening members, such as a bolt, a nut, and a washer. In addition, the fastening portions 130 may be further provided with busbars BB, through which the plurality of metal bars extend. When the transformer 100 is mounted on a board, the busbars BB may serve to fix the transformer 100 to the board while serving as an electrical path to a secondary side coil.

The core unit 140, which has the function of a magnetic circuit, may serve as a path of magnetic flux. The core unit may include an upper core 141 coupled at the upper side thereof and a lower core 142 coupled at the lower side thereof. The two cores 141 and 142 may have up-down symmetrical shapes or asymmetrical shapes. The core unit 140 may include a magnetic material, such as iron or ferrite. However, the disclosure is not limited thereto. The concrete shape of the core unit 140 will be described below with reference to FIG. 6.

The primary coil unit 160 may include a first conductive wire 161 and a second conductive wire 162. The primary coil unit 160 may have the shape of a multiple winding formed of a rigid conductive metal, such as a copper conductive wire, wound several times, for example a Litz wire. Each of the first conductive wire 161 and the second conductive wire 162 may be disposed so as to form turns around a corresponding one of the outer legs of the core unit 140. For example, the first conductive wire 161 may be disposed so as to form turns around one-side outer legs 141_2 and 142_2, and the second conductive wire 162 may be disposed so as to form turns around the other-side outer legs 141_3 and 142_3 disposed in a direction opposite the one-side outer legs based on middle legs 141_1 and 142_1. In addition, an end of a conductive wire constituting the first conductive wire 161 may be withdrawn outwards through a first opening OP1 of the bobbin 110, and an end of a conductive wire constituting the second conductive wire 162 may be withdrawn outwards through a second opening OP2 of the bobbin 110. In addition, the remainder of the primary coil unit 160 excluding the ends exposed through the first opening OP1 and the second opening OP2 of the bobbin 110 may be received in a receiving hole defined in the bobbin 110.

Figure 5:
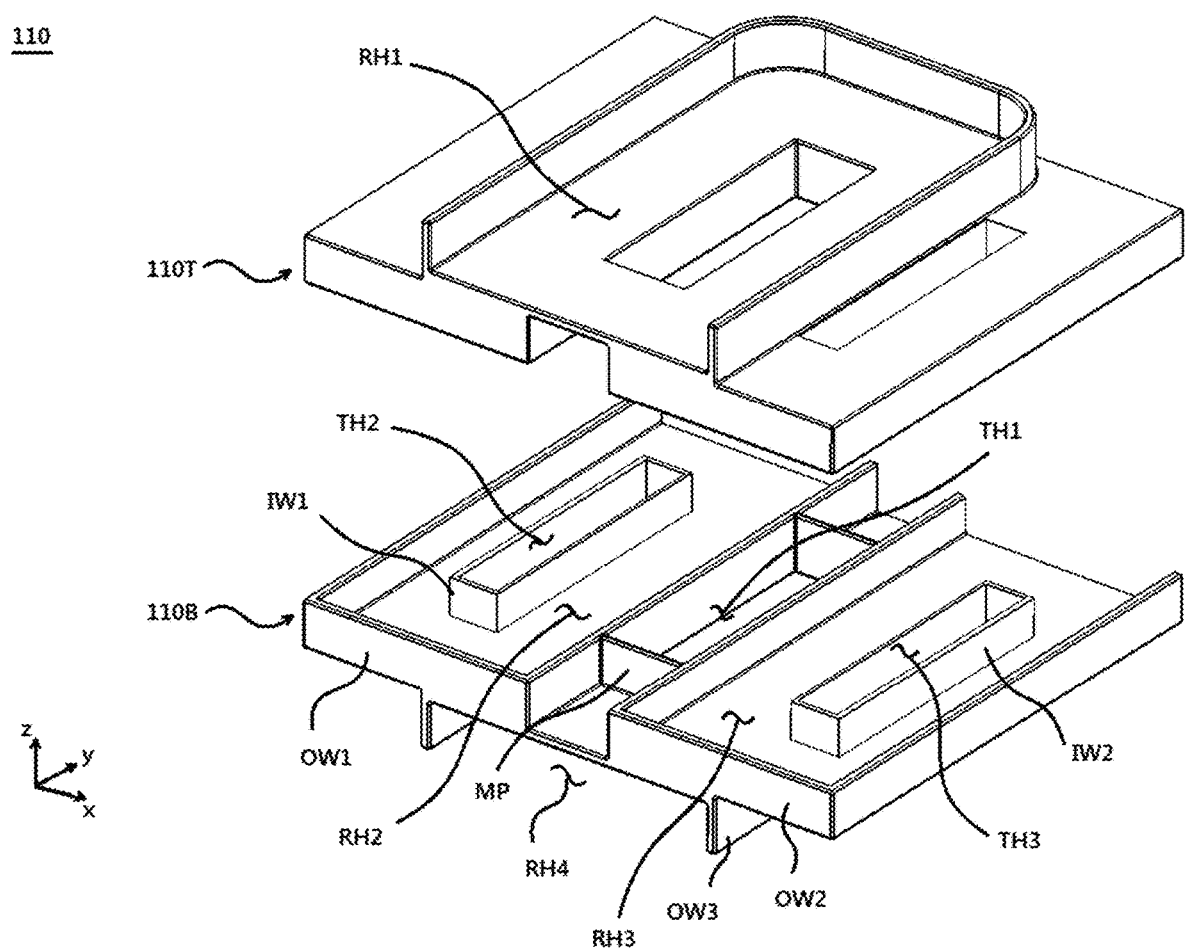
FIG. 5 is an exploded perspective view showing the shape of a bobbin according to an embodiment.

FIG. 5 is an exploded perspective view showing the shape of a bobbin 110 according to an embodiment.

Referring to FIG. 5, the bobbin 110 according to the embodiment may include an upper bobbin 110T and a lower bobbin 110B. The upper bobbin 110T has a first receiving hole RH1 configured to receive the upper coil unit 120T, and the lower bobbin 110B has a fourth receiving hole RH4 configured to receive the lower coil unit 120B.

The first receiving hole RH1 and the fourth receiving hole RH4 have up-down symmetrical shapes in the thickness direction (e.g. the z-axis direction), the first receiving hole RH1 is open upwards, and the fourth receiving hole RH4 is open downwards. Consequently, at least a portion of the uppermost conductive plate of the upper coil unit 120T received in the first receiving hole RH1 is exposed upwards, and at least a portion of the lowermost conductive plate of the lower coil unit 120B received in the fourth receiving hole RH4 is exposed downwards. Consequently, at least one surface of each of the upper coil unit 120T and the lower coil unit 120B has a wide heat dissipation area. As a result, heat may be transferred to ambient air depending on the position of the exposed surface, or heat may be rapidly transferred to the core unit 140 when the core unit 140 is coupled, which is good for heat dissipation.

In addition, when the upper bobbin 110T and the lower bobbin 110B are coupled to each other, a second receiving hole RH2 configured to receive the first conductive wire 161 and a third receiving hole RH3 configured to receive the second conductive wire 162 are defined. In addition, when the upper bobbin 110T and the lower bobbin 110B are coupled to each other, a first through hole TH1, through which the middle legs 141_1 and 142_1 of the core unit 140 extend, a second through hole TH2, through which one-side outer legs 141_2 and 142_2 of the core unit 140 extend, and a third through hole TH3, through which the other-side outer legs 141_3 and 142_3 of the core unit 140 extend, are defined.

The upper bobbin 110T and the lower bobbin 110B may have up-down symmetrical shapes. In another embodiment, however, the upper bobbin 110T and the lower bobbin 110B may have asymmetrical shapes. In the following description, the shape of the lower bobbin 110B will be described on the assumption that the upper bobbin 110T and the lower bobbin 110B have up-down symmetrical shapes.

The lower bobbin 110B includes a first outer wall OW1 and a second outer wall OW2 disposed spaced apart from each other in parallel in one horizontal direction (e.g. an x-axis direction) and extending upwards. Each of the first outer wall OW1 and the second outer wall OW2 may have a "U"-shaped planar shape or a track-shaped planar shape having a semicircle cut off therefrom, or may have a quadrangular planar shape having one short side cut off therefrom. In addition, a first inner wall IW1 is disposed in the first outer wall OW1, and a second inner wall IW2 is disposed in the second outer wall OW2. The inner surface of the first inner wall IW1 may define a side wall of the second through hole TH2, and the inner surface of the second inner wall IW2 may define a side wall of the third through hole TH3.

In addition, the inner surface of the first outer wall OW1 and the outer surface of the first inner wall IW1 may together define the second receiving hole RH2, and the inner surface of the second outer wall OW2 and the outer surface of the second inner wall IW2 may together define the third receiving hole RH3.

Meanwhile, a middle partition MP may be disposed between two adjacent outer surfaces of the first outer wall OW1 and the second outer wall OW2. The middle partition MP may define the first through hole TH1 together with the first outer wall OW1 and the second outer wall OW2.

In addition, a third outer wall OW3, which defines the fourth receiving hole RH4, may be disposed at the lower surface of the lower bobbin 110B. The second outer wall OW2 may have a "U"-shaped planar shape or a track-shaped planar shape having a semicircle cut off therefrom, or may have a quadrangular planar shape having one short side cut off therefrom. However, the disclosure is not limited thereto. It is sufficient for the second outer wall to have a shape suitable to receive the lower coil unit 120B.

Meanwhile, each of the through holes TH1, TH2, and TH3 is shown as having a quadrangular planar shape, which, however, is illustrative. It is sufficient for the through holes to have shapes corresponding to the planar shapes of the middle leg and the outer legs of the core unit 140.

Figure 6:
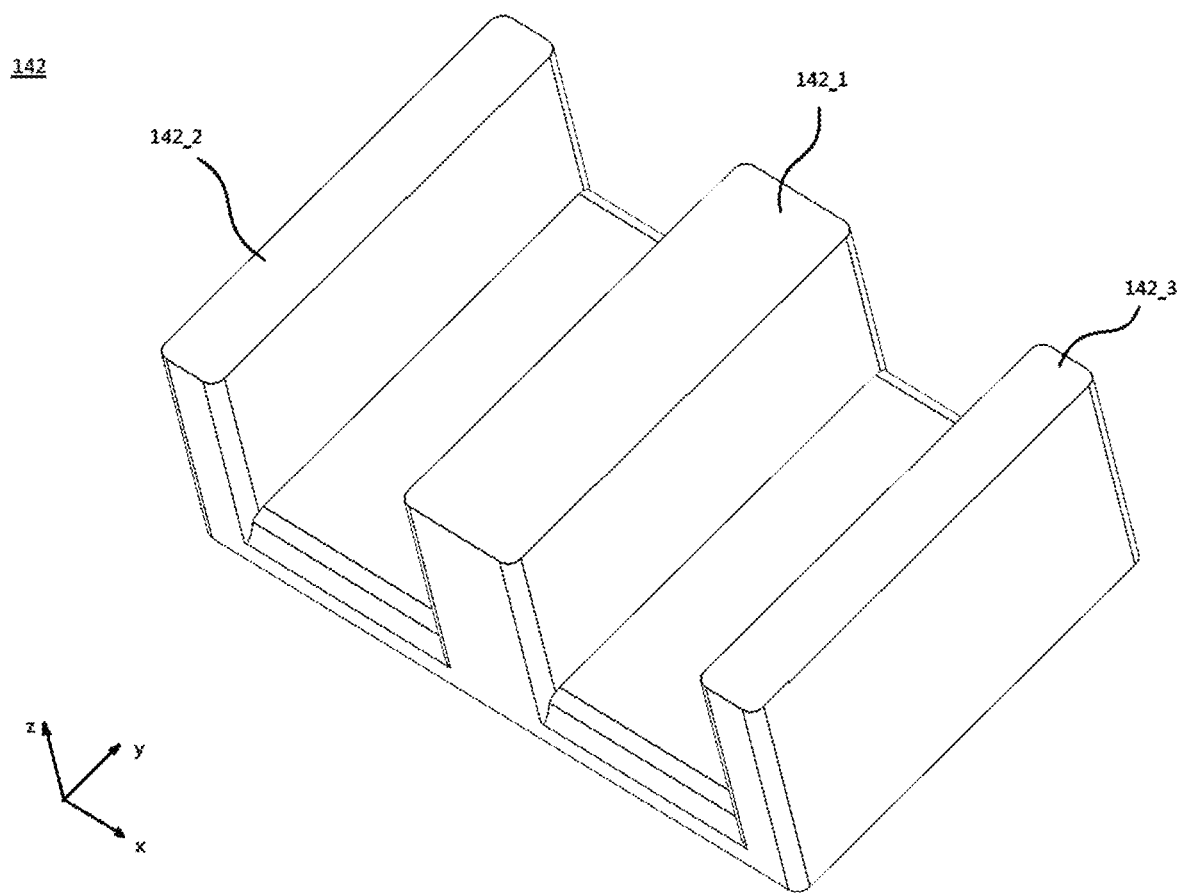
FIG. 6 is a perspective view showing the external appearance of a lower core according to an embodiment.

Next, the construction of the core unit 140 will be described with reference to FIG. 6. FIG. 6 is a perspective view showing the external appearance of the lower core. Although the lower core 142 of the core unit 140 will be described with reference to FIG. 6, a description of the upper core 141 will be substituted thereby on the assumption that the upper core 141 and the lower core 142 have up-down symmetrical shapes.

Referring to FIG. 6, a body, i.e. the lower surface, of the lower core 142 may have a rectangular planar shape including long sides extending in one direction (e.g. the x-axis direction) and short sides in the other direction (e.g. the y-axis direction) intersecting the one direction.

In addition, the lower core 142 may include a middle leg 142_1 and outer legs 142_2 and 142_3 disposed at opposite sides around the middle leg 142_1. For example, the first outer leg 142-2 may extend from one side of the body of the lower core 142 in a vertical direction, and the second outer leg 142-3 may extend from the other side of the body in the vertical direction. In addition, the middle leg 142_1 may be disposed between the first outer leg 142-2 and the second outer leg 142-3, and may extend from the body in the vertical direction. Each of the middle leg 142_1 and the outer legs 142_2 and 142_3 may have a quadrangular planar shape, and corners thereof may have a predetermined curvature, as shown in FIG. 6.

Meanwhile, when coupled to the bobbin 110, a middle leg (not shown) of the upper core 141 and the middle leg 142_1 of the lower core 142 may be spaced apart from each other by a predetermined distance (e.g. 100 nm) to form a gap.

Next, the construction of the plurality of conductive plates constituting the secondary coil unit will be described with reference to FIG. 7.

Figure 7:
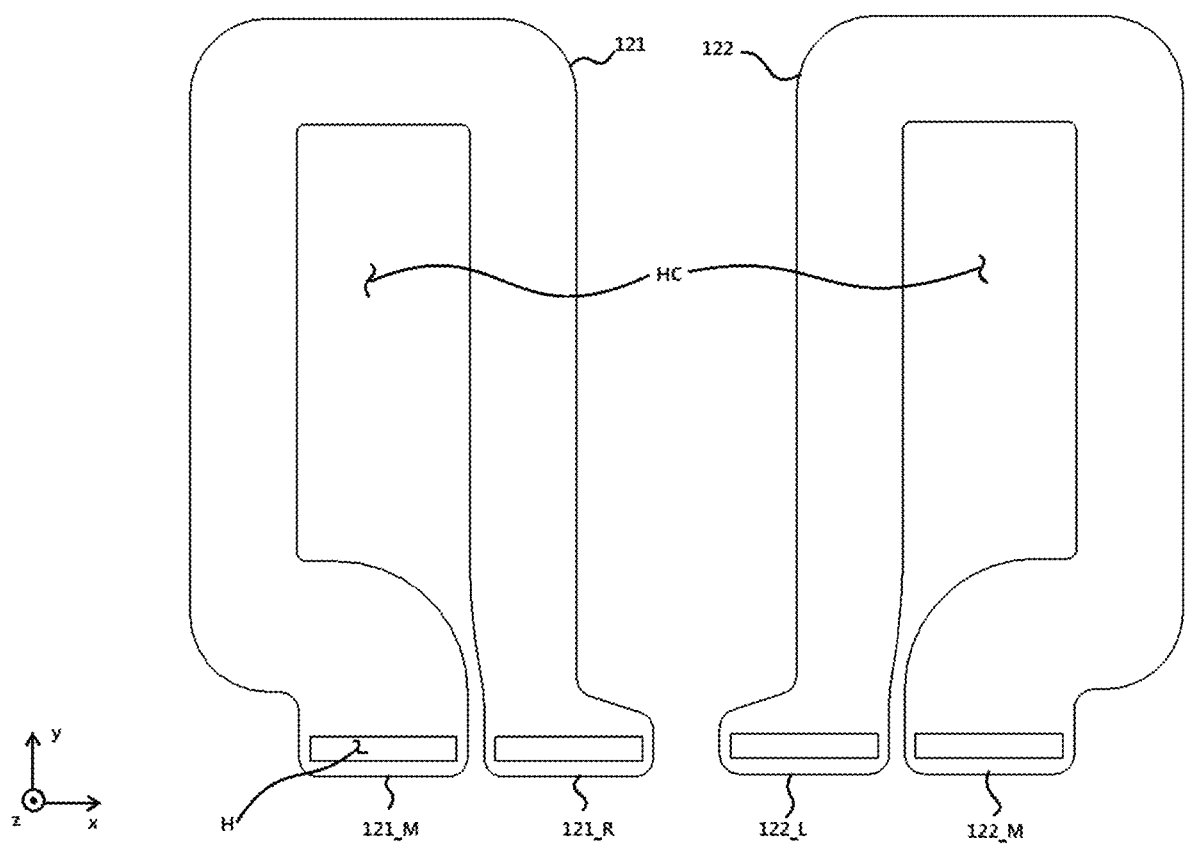
FIG. 7 is a view showing planar shapes of two types of conductive plates according to an embodiment.

FIG. 7 is a view showing planar shapes of two types of conductive plates according to an embodiment.

Referring to FIG. 7, two conductive plates 121 and 122 having different planar shapes are shown. The first type conductive plate 121 has the same shape as the second type conductive plate 122 except that left and right sides thereof are reversed. Consequently, a description will be given based on the first type conductive plate 121.

The conductive plate 121 according to the embodiment may have an open ring-type planar shape having two ends 121_M and 121_R in order to constitute one turn of the secondary coil unit. In this specification including FIG. 7, each of the conductive plates 121 and 122 is shown as having an open quadrangular shape in which outer corners around a hollow cavity HC are round, which, however, is illustrative. The planar shape may be an open circular/elliptical ring shape or an open polygonal ring shape.

For example, the first type conductive plate 121 may have a "q"-shaped planar shape. In addition, the second type conductive plate 122 may have a "p"-shaped planar shape, since the first type conductive plate 121 and the second type conductive plate 122 have left-right symmetrical shapes.

In addition, each end may be provided with a through hole H, through which the fastening portion 130 extends. In FIG. 7, a through hole H having a rectangular planar shape is shown as being formed in each end. However, the number and position of holes may be changed.

Meanwhile, based on the first type conductive plate 121, the first end 121_M may be referred to as a ground end, since the first end is connected to the ground, and the second end 121_R may be referred to as a first signal end, since the second end is connected to one signal line. Similarly, the second type conductive plate 122 may also have one ground end 122_M and one signal end 122_L. The signal end 122_L is located in a direction opposite the first signal end 121_R, and may be referred to as a second signal end.

In the case in which two sheets of conductive plates are applied to one coil unit constituting the secondary coil unit 120 and 130, e.g. the upper coil unit 120T, therefore, two ground ends, two first signal ends, and two second signal ends are provided. Here, the two ground ends may be aligned around the through hole H so as to at least partially overlap each other in the vertical direction.

Each of the upper coil unit 120T and the lower coil unit 120B may be configured such that the first type conductive plate 121 and the second type conductive plate 122 are alternately stacked so as to be aligned around the hollow cavity HC in the vertical direction in a state of forming at least one pair.

The effects of the transformer according to the above embodiment will be described with reference to FIG. 8.

FIG. 8 is a sectional view of the transformer according to the embodiment. In FIG. 8, the section of the transformer 100 cut off in a direction parallel to the major-axis direction (e.g. the x-axis direction) of the core unit 140 is shown, and illustration of the bobbin 110 is omitted for easy understanding.

Referring to FIG. 8, the transformer 100 according to the embodiment is configured such that the plurality of conductive plates 120 constituting the secondary coil unit is disposed so as to form turns around the middle leg and the conductive wires constituting the primary coil unit 160 are wound so as to form turns around the outer legs. The primary coil unit 160 is disposed between the upper coil unit 120T and the lower coil unit 120B in the vertical direction, and the first conductive wire 161 and the second conductive wire 162 constituting the primary coil unit are disposed spaced apart from each other in parallel in the horizontal direction.

As the result of having the above construction, the transformer according to the embodiment has the following advantages, compared to a general transformer configured such that both a primary coil unit and a secondary coil unit are disposed so as to form turns around a middle leg.

In the general transformer, the entirety of the primary coil unit is wound around the middle leg. In order to constitute the same number of turns, therefore, at least twice the height h1 that the primary coil unit 160 of the transformer according to the embodiment occupies in the vertical direction must be secured. In contrast, in the transformer according to the embodiment, the primary coil unit 160 is divided into two coil units, which are spaced apart from each other in parallel in the horizontal direction and are wound around the outer legs of the core unit 140. Consequently, the height to be secured in order to wind the primary coil unit 160 is reduced by at least h1, compared to the general transformer. As a result, the overall height h2 of the core unit 140 is reduced by h1, whereby the core unit has a slim external appearance, compared to the general transformer.

In addition, a decrease in height of the core unit 140 is advantageous to cooling. For example, when the transformer 100 is mounted on a DC-DC converter, the lower part of the core unit 140 is disposed so as to transfer heat to a housing CP of the DC-DC converter, and it is natural that a refrigerant (e.g. a coolant) of a vehicle is circulated at the surface of the housing CP opposite the surface of the housing disposed in contact with the core unit 140. In this case, the lower the height of the core unit 140, the shorter the heat transfer distance. Consequently, heat generated from the transformer may be rapidly discharged through the housing CP.

Figure 1:
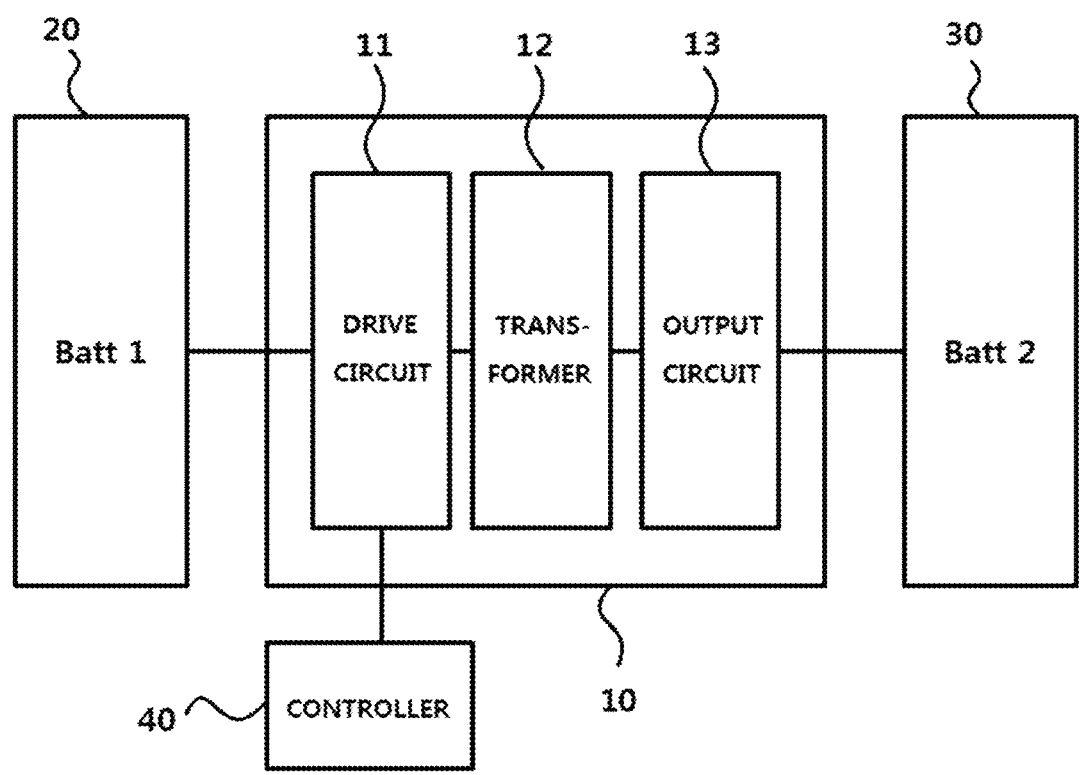
FIG. 1 is a block diagram showing an example of the construction of a general DC-DC converter.
Figure 2A:
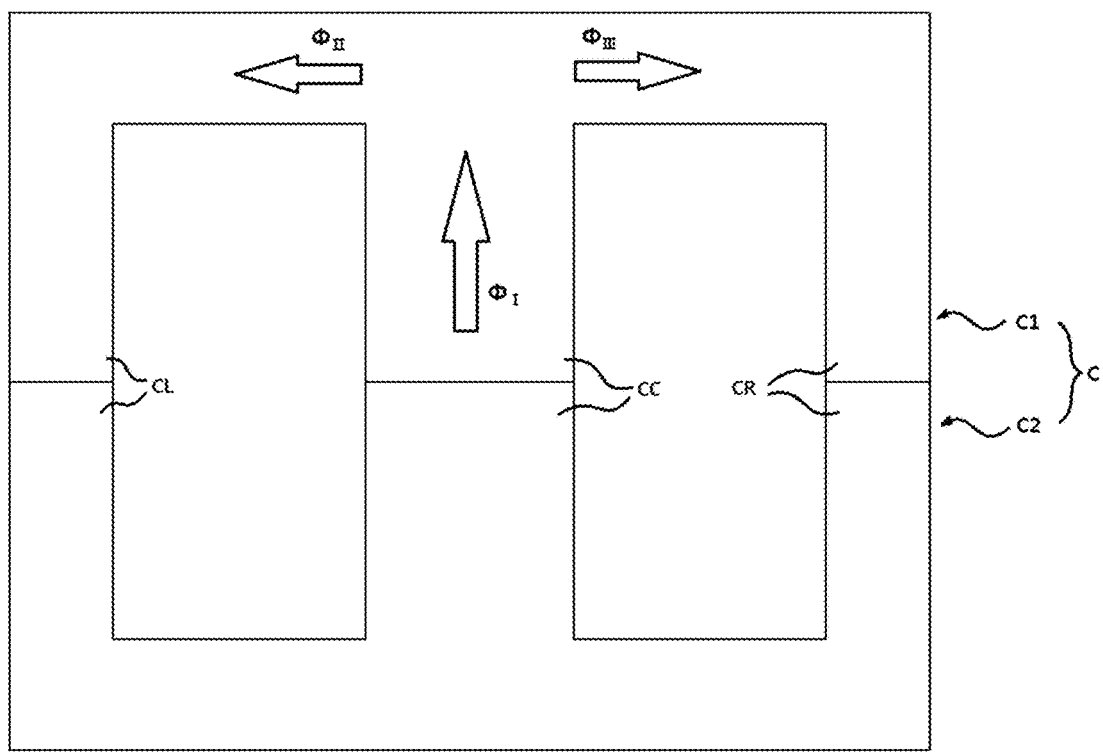
FIG. 2A is a front view of a general magnetic core.
Figure 2B:
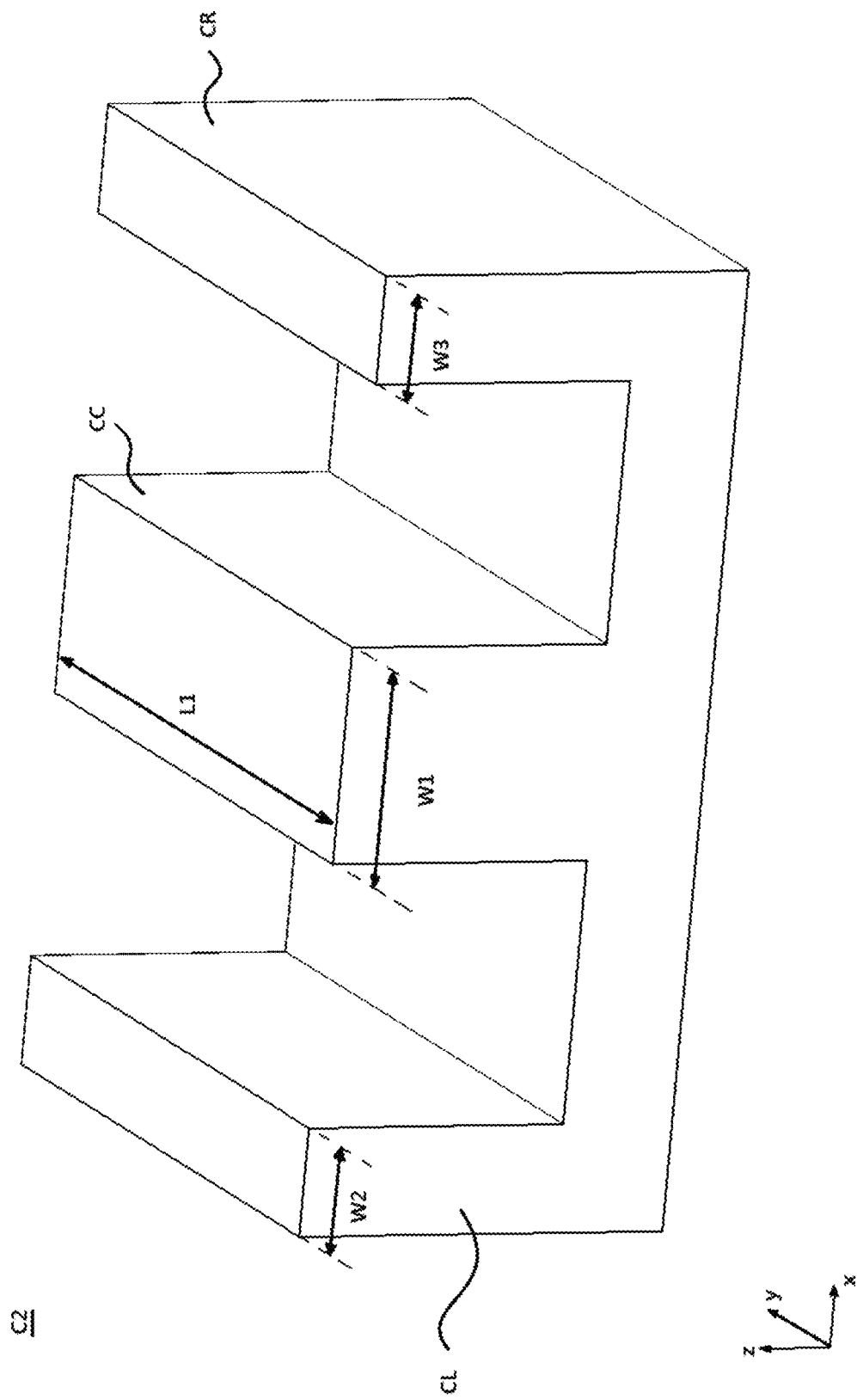
FIG. 2B is a perspective view of a lower core constituting the general magnetic core.

In addition, as the result of having the above structure, the length of the conductive wire constituting the primary coil unit 160 may be shorter than in the case in which the conductive wire is wound around the middle leg. For example, on the assumption that the widths w2 and w3 of the outer legs are equal to each other and each of the widths w2 and w3 is half the width w1 of the middle leg (i.e. w1=2*w2) in FIG. 2B, a conductive wire having a length corresponding to the circumference of the middle leg (2*L1+2*(2*w2)) is necessary in order to constitute one turn in the general transformer. In contrast, when wound around the outer leg, as in the embodiment, a conductive wire having a length to the circumference of the outer leg (2*L1+2*2w2)) is necessary. In the embodiment, therefore, a length of the conductive wire corresponding to 2*w2 may be reduced per turn, compared to the general transformer. As a result, the manufacturing cost of the transformer may be reduced, and resistance may be reduced and thus generation of heat may be reduced due to a decrease in length of the conductive wire, whereby efficiency may also be improved.

The results of heat generation experiments of the transformer according to the embodiment and the general transformer are shown in Table 1 below. In the heat generation experiments, saturation temperatures of the transformer according to the embodiment and the general transformer on DC-DC converters having the same capacity (3.2 kW) were measured.

TABLE 1

| Remarks | Structure of primary coil unit | Primary side coil temperature (° C.) | Secondary side coil temperature (° C.) | Upper core temperature (° C.) |
| --- | --- | --- | --- | --- |
| Comparative Example | Winding around middle leg | 127 | 140 | 135 |
| Embodiment | Winding around outer leg | 120 | 133 | 125 |

Referring to Table 1, it can be seen that, in the transformer according to the embodiment, the temperature of each coil unit is lower by 7 degrees and the upper core temperature is lower by 10 degrees than in the general transformer according to the comparative example.

The technical contents of the above embodiments may be combined in various forms unless they are incompatible with each other, and a new embodiment may be implemented therethrough.

In addition, the transformer 100 according to the above embodiment may be mounted on an instrument transformer, an AC calculation panel, a DC-DC converter, a booster, or a step-down transformer.

It will be apparent to those skilled in the art that the disclosure may be embodied in specific forms other than those set forth herein without departing from the spirit and essential characteristics of the disclosure. Therefore, the above embodiments should be construed in all aspects as illustrative and not restrictive. The scope of the disclosure should be determined by the appended claims and their legal equivalents, and all changes falling within the meaning and equivalency range of the appended claims are intended to be embraced therein.

The invention claimed is:

1. A transformer comprising:
 a core unit having a body, a first outer leg extending from one side of the body in a first direction, a second outer leg extending from an other side of the body in the first direction, and a middle leg disposed between the first outer leg and the second outer leg, the middle leg extending from the body in the first direction;

a secondary coil unit comprising a plurality of conductive plates stacked in the first direction so as to form turns around the middle leg;

a primary coil unit comprising a first conductive wire wound so as to form turns around the first outer leg and a second conductive wire wound so as to form turns around the second outer leg; and a bobbin having a first through hole, through which the middle leg extends, a second through hole, through which the first outer leg extends, and a third through hole, through which the second outer leg extends, wherein the secondary coil unit comprises an upper coil unit disposed at an upper part of the bobbin and a lower coil unit disposed at a lower part of the bobbin, the bobbin provides a first receiving hole configured to receive the upper coil unit, a second receiving hole configured to receive the first conductive wire, a third receiving hole configured to receive the second conductive wire, and a fourth receiving hole configured to receive the lower coil unit, the first receiving hole is configured to expose upwards an upper surface of a conductive plate located at an uppermost end of the upper coil unit, and the fourth receiving hole is configured to expose downwards a lower surface of a conductive plate located at a lowermost end of the lower coil unit.

2. The transformer according to claim 1, wherein the plurality of conductive plates constituting the upper coil unit and the lower coil unit comprises a plurality of first type conductive plates having a first planar shape and a plurality of second type conductive plates having a second planar shape, and the first type conductive plates and the second type conductive plates are alternately stacked in a vertical direction.

3. The transformer according to claim 2, wherein the first planar shape and the second planar shape are left-right symmetric.

4. The transformer according to claim 1, wherein the second receiving hole and the third receiving hole are disposed between the first receiving hole and the fourth receiving hole in a vertical direction.

5. The transformer according to claim 1, wherein the second receiving hole and the third receiving hole are disposed spaced apart from each other in parallel in a horizontal direction.

6. A DC-DC converter comprising:

a drive circuit;

a transformer; and an output circuit, wherein the transformer comprises:

a core unit having a body, a first outer leg extending from one side of the body in a first direction, a second outer leg extending from an other side of the body in the first direction, and a middle leg disposed between the first outer leg and the second outer leg, the middle leg extending from the body in the first direction;

a secondary coil unit comprising a plurality of conductive plates stacked in the first direction so as to form turns around the middle leg;

a primary coil unit comprising a first conductive wire wound so as to form turns around the first outer leg and a second conductive wire wound so as to form turns around the second outer leg; and a bobbin having a first through hole, through which the middle leg extends, a second through hole, through which the first outer leg extends, and a third through hole, through which the second outer leg extends, wherein the secondary coil unit comprises an upper coil unit disposed at an upper part of the bobbin and a lower coil unit disposed at a lower part of the bobbin, the bobbin provides a first receiving hole configured to receive the upper coil unit, a second receiving hole configured to receive the first conductive wire, a third receiving hole configured to receive the second conductive wire, and a fourth receiving hole configured to receive the lower coil unit, the first receiving hole is configured to expose upwards an upper surface of a conductive plate located at an uppermost end of the upper coil unit, and the fourth receiving hole is configured to expose downwards a lower surface of a conductive plate located at a lowermost end of the lower coil unit.

7. The transformer according to claim 1, wherein the second receiving hole comprises a first opening configured to withdraw an end of the first conductive wire to an outside, and the third receiving hole comprises a first opening configured to withdraw an end of the second conductive wire to the outside.

8. The transformer according to claim 1, wherein the bobbin comprises a first outer wall and a second outer wall disposed spaced apart from each other in parallel in a horizontal direction and extending in the vertical direction.

9. The transformer according to claim 8, wherein the bobbin comprises a first inner wall disposed in the first outer wall and a second inner wall disposed in the second outer wall.

10. The transformer according to claim 9, wherein an inner surface of the first inner wall defines a side wall of the second through hole, and an inner surface of the second inner wall defines a side wall of the third through hole.

11. The transformer according to claim 9, wherein an inner surface of the first outer wall and an outer surface of the first inner wall define the second receiving hole, and an inner surface of the second outer wall and an outer surface of the second inner wall define the third receiving hole.

12. The transformer according to claim 8, wherein the bobbin comprises a middle partition disposed between two adjacent outer surfaces of the first outer wall and the second outer wall.

13. The transformer according to claim 12, wherein the middle partition defines the first through hole together with the first outer wall and the second outer wall.

14. The transformer according to claim 1, wherein the secondary coil unit comprises a fastening portion configured to electrically connect the upper coil unit and the lower coil unit to each other.

* * * * *